United States Patent [19]

Kato et al.

[11] Patent Number: 5,028,351

[45] Date of Patent: Jul. 2, 1991

[54] PROCESS FOR PREPARING ORGANIC SMECTITE BY SOLID-SOLID REACTION

[75] Inventors: Chuzo Kato, 2-3-4, Kamiosaki, Shinagawa-ku, Tokyo; Kazuyuki Kuroda; Makoto Ogawa, both of Tokyo, all of Japan

[73] Assignee: Chuzo Kato, Tokyo, Japan

[21] Appl. No.: 515,305

[22] Filed: Apr. 27, 1990

[30] Foreign Application Priority Data

Sep. 28, 1989 [JP] Japan .................................. 1-253188

[51] Int. Cl.$^5$ ...................... C04B 14/12; C08K 3/29; C08K 3/34
[52] U.S. Cl. ................................. 252/315.2; 252/184; 524/447; 106/416
[58] Field of Search ............................ 252/148, 315.2; 524/447; 502/68, 80; 106/416, 773, 811

[56] References Cited

U.S. PATENT DOCUMENTS

| | | | |
|---|---|---|---|
| 2,033,856 | 3/1936 | Smith | 546/10 |
| 2,531,427 | 5/1946 | Hauser | 556/9 |
| 4,474,706 | 10/1984 | Clay | 556/173 |

OTHER PUBLICATIONS

"Interactions Between Crystalline Medicinals and Porous Clay" by Y. Nakai et al, 34(11), pp. 4760–4766, 1986.

"Base Exchange Reactions of Bentonite and Salts of Organic Bases", by C. R. Smith, J. Am. Chem. Soc., 56, p. 1561, 1934.

"Hydration Mechanism of the Clay Mineral Montmorillonite Saturated with Various Cations" by S. B. Hendricks, J. Am. Chem. Soc., 62, p. 1457, 1940.

"Organophilic Bentonites" by J. W. Jordan, J. Phys. & Colloid Chem., 53, p. 294, 1949.

"Lattice Expansion of Kaolin Minerals by Treatment with Potassium Acetate" by K. Wada, Am. Mineral, 46, p. 78, 1961.

"Adsorption and Desorption of N-Methyl 8-Hydroxy Quinoline Methyl Sulfate on Smectite and the Potential Use of the Clay-Organic Product as an Ultraviolet Radiation Collector" by M. A. Vincente et al., 37, p. 157, 1989..

Kuroda, et al, Abst. 9th International Clay Conference, Session 3, Abstr. 214, (1989).

Ogawa et al, Chemistry Letters, The Chemical Society of Japan, CMLTAG (9):1659–1662 (1989).

Primary Examiner—Robert L. Stoll
Assistant Examiner—Greg M. Sweet
Attorney, Agent, or Firm—Lowe, Price, LeBlanc, Becker & Shur

[57] ABSTRACT

A process for preparing organic smectite applied for thickener, protective colloid, dispersant and binder. The present invention features the process for preparing the organic smectite by mixing smectite incluidng 0 to 20% by weight of interlayer water in the interlayer spaces of said smectite with organic cation-supplying substance selected from at least one of aliphatic alkylamine salts, aromatic amine salts and basic organic compound having pyridine nucleus, and/or basic organic molecule in a mixing ratio of the latter to the former of 10 to 500 milliequivalents per 100 g smectite, and stirring the resulting mixture at a temperature of 5° to 50° C. under an applied pressure of 0.5 to 10 kg/cm$^2$ to cause a solid-solid reaction. By the process of the present invention, exchangeable organic cations and/or basic organic molecules as a guest substance are intercalated int he interlayer spaces of the smectite as a host substance, thus the hydrophilic smectite can convert to the organic smectite by a more simplified solid-solid reaction than a liquid-liquid reaction.

2 Claims, No Drawings

PROCESS FOR PREPARING ORGANIC SMECTITE BY SOLID-SOLID REACTION

BACKGROUND OF THE INVENTION

1. Field of the invention

This invention relates to a process for preparing organic smectite which is mainly applied for thickener used for grease, printing ink, lipophilic paint, synthetic resin paste and the like, protective colloid, dispersant and binder.

2. Description of the prior art

Processes for preparing organic bentonite made by olephilization of bentonite (sodium salt and/or calcium salt of montmorillonite), which is one kind of smectite, have been studied for a number of years. At first, C. R. Smith in 1934 produced a composite by combining the bentonite with an organic compound (J. Am. Chem. Soc., 56, 1561, (1934)), and this process was patented (C. R. Smith: U.S. Pat. No. 2,033,856 Mar. 10, 1936). Since then, the study of organic bentonite was made more closely by S. B. Hendricks (J. Am. Chem. Soc., 62, 1457 (1940)), J. W. Jordan (J. Phys. & Colloid Chem., 53, 294 (1949)) and E. A. Hauser (U.S. Pat. No. 2,531,427 Nov. 28, 1950)

All of these processes comprise the following steps; At first, bentonite is dispersed into water to be swollen and is purified by a hydraulic elutriation to form a suspension. Then, an aqueous solution including organic cations is added to the suspension to produce a condensed precipitate. Then, by filtering, dehydrating, drying and finely powdering the precipitate, organic bentonite is produced. In order to supply the organic cations for this process, aliphatic amine salts such as octadecylamine acetate $C_{18}H_{37}NH_2 \cdot HOCOCH_3$ and quaternary ammonium salts such as dimethyldioctadecylammonium chloride $(C_{18}H_{37})_2N(CH_3)_2 \cdot Cl$ were used as organic compounds.

Organic bentonite was firstly on the market as Benton (trade name) by National Lead Co., USA in the 1950s, then, it has been commercially available also in Japan as Orben (trade name) by Shiraishi Industry Co. Ltd., Japan, Organite and S-Ben (trade names) by Hojun Mining Industry Co. Ltd., Japan, and the like until the present.

The process for preparing organic bentonite has been carried by a liquid-liquid reaction between a suspension including bentonite which is one kind of smectite and an aqueous solution of organic amine. By the liquid-liquid reaction, alkaline metal ions or alkali earth metal ions in the interlayer spaces of montmorillonite which is a main component of the bentonite are exchanged for organic amine ions. The reason why the liquid-liquid reaction has been used is as follows. According to the above mentioned process by C. R. Smith et al., after the bentonite in water is purified by a hydraulic elutriation, the aqueous solution containing the bentonite must be filtered in order to be used for obtaining the organic bentonite. In this case, the method of filtering the aqueous solution of the swollen bentonite is very difficult. Compared with this method, the method of filtering a precipitated product obtained by reacting the suspension of the bentonite with the aqueous solution of the organic amine is easier. In addition, it is natural for all of those who have studied this field to come up with only the liquid-liquid reaction, because this field began with the finding of the phenomenon of ion exchange in the 1930s. Therefore, the solid-solid reaction between the particles of the smectite and that of the organic amine has not been considered until the present.

On the other hand, it was reported that kaolinite, which has a different crystalline structure from that of bentonite, can form intercalation compounds by a solid-solid reaction, that is by grinding the powder mixture of kaolinite and potassium acetate by K. Wada (Am. Mineral, 46. 78 (1961)). However, in this case, it requires a whole day to finish the reaction.

Clay et al. (U.S. Pat. No. 4,474,706) disclose the dry process for the production for an organophilic clay. However, the dry process in this Patent does not mean a solid-solid reaction but a water free process in which melted organic ammonium salts are reacted with a dry clay. In this process, the reactants are mixed or blended at elevated temperature, e.g. temperature ranging up to 60° C. or higher, so that the ammonium salts are in liquid form and mixing of the reactants is rigourous. Therefore, this process is distinguished from the solid-solid reaction.

Moreover, in the field of medicine, there have been reports about the intercalation reactions between smectite and specific medicines by M. A. Vincente et al. (Clays & Clay Miner., 37, 157 (1989)) and Y. Nakai et al. (Chem. Pharm. Bull. 34 (11), 4760–4766 (1986)). However, these kinds of reaction are rather adsorptions of the medicines than a solid. solid reaction. Further these kind of reaction have different object from that of the solid-solid reaction of the present invention.

As a result, there has been no report related to the solid-solid reaction producing the organic smectite which is applied to thickener, protective colloid, dispersant and binder provided by the present invention.

The conventional process for preparing the organic smectite by the liquid-liquid reaction has following problems. The conventional process requires the step in which bentonite minerals are dispersed in water, swollen and purified by a hydraulic elutriation to form a suspension required for the liquid-liquid reaction. Further, the conventional process has a problem related to environmental pollution as for the treatment of waste water and industrial waste caused from the step in which the swollen bentonite is purified by the hydraulic elutriation. Moreover, in the liquid-liquid reaction, an organic guest substance is intercalated in the interlayer spaces of host bentonite, after the crystalline structure of the host bentonite is broken once. Accordingly, irregular stacking is caused in the composite of organic bentonite and the product has low crystallinity.

SUMMARY OF THE INVENTION

As to a process for preparing organic smectite, which has been thought naturally to be carried by a liquid-liquid reaction and which has never been carried by a solid solid reaction, the inventor has researched the possibility of the solid-solid reaction and studied about it between host smectite and an organic guest substance to attain the present invention.

It is an object of the present invention to provide a process for preparing organic smectite improved in quality having a steady crystalline structure by a more simplified solid-solid reaction than a liquid-liquid reaction.

It is another object of the present invention to provide a process for preparing organic smectite causing no social problem related to environmental pollution and no commercial problem for manufacturers related to antipollution measures.

It is another object of the present invention to provide a process for preparing organic smectite in which the adjustment pH, the use of solvents and their choice are unnecessary.

It is another object of the present invention to provide a process for preparing widely useful and cheap organic smectite.

It is another object of the present invention to provide a process for preparing many kinds of organic smectite in grade and in amount for many kinds of requirement.

The present invention features the process for preparing organic smectite applied for thickener, protective colloid, dispersant and binder, which comprises:

mixing smectite including 0 to 20% by weight of interlayer water in the interlayer spaces of said smectite with an organic cation-supplying substance selected from at least one of aliphatic alkylamine salts, arOmatiC amine salts and basic organic compounds having pyridine nucleus, and/or basic organic molecules in an mixing ratio of the latter to the former of 10 to 500 milliequivalents per 100g smectite, and stirring the resultant mixture at a temperature of 5 to 50° C. under an applied pressure of 0.5 to 10 kg/cm$^2$ to cause a solid-solid reaction.

In the preferable embodiment of the present invention, said basic organic molecules are selected from at least one of acrylamide, methacrylamide, urea, phenanthroline, bipyridyl, diazo compounds, azo compounds and transition metal trisbi. pyridyl complexes.

Other and further objects, features and advantages of the present invention will appear more fully from the following description.

DETAILED DESCRIPTION OF THE INVENTION

The fundamental principle of the process according to the present invention is that exchangeable organic cations and/or basic organic molecules as a guest substance are intercalated in the interlayer spaces of smectite as a host substance, thus the hydrophilic smectite converts to organic smectite by a solid-solid reaction caused from a contact of the guest substance and the host substance, instead of conventional processes carried by liquid-liquid reactions.

As smectite to be a host crystal, besides montmorillonite whose sodium salts and/or calcium salts are bentonite (common name), there are beidellite, nontronite, saponite, hectorite the host substance to produce the organic smectite by the solid-solid reaction of the present invention.

The guest organic substance, used in the process of the present invention, is organic cations and/or basic organic molecules as they are.

As the substance supplying organic cations, there can be mentioned aliphatic alkylamine salts, aromatic amine salts, basic organic compounds having pyridine nucleus. More concrete examples are shown as follows; The aliphatic alkylamine salts can include, for example, primary-, secondary-, or tertiary-amine salts such as hydrochlorides or acetates of hexylamine, diethylamine, trimethylamine and octadecylamine and quarternary ammonium salts of dimethyldioctadecylamine and the like. The aromatic amine salts can include, for example, hydrochlorides of aniline and benzyl. methylstearylamine. The basic organic compounds having pyridine nucleus can include, for example, hydrochlorides of pyridine and dodecylpyridine. Organic ammonium ions, pyridinium bases and the like act as the guest substances which are intercalated in the interlayer spaces of the smectite.

As the basic organic molecules, there can be mentioned acrylamide, methacrylamide, urea, phenanthroline, bipyridyl, diazo compounds, azo compounds and transition metal trisbipyridyl complexes. They are reacted as the guest substance as they are. When, acrylamide or methacrylamide is used as the guest substance, it is preferable to add an initiator of polymerization so that stable poly(acrylamide) or polyo-(methacrylamide) is formed in the interlayer spaces of the smectite.

One kind or combination of more than two kinds of organic substance can be selected as the guest substance for the process.

The solid-solid reaction is affected mainly from the smectite as the host substance, particularly from amounts of water molecules around exchangeable cations of the smectite. The smectite whose weight ratio of water in the interlayer spaces is 0% has vacant spaces without water, thus it is easy for the guest organic substance to be intercalated in the interlayer spaces of the smectite. For example, in case that the smectite is heated at 300° C. to remove completely the water in the interlayer spaces of the smectite, alkylammonium ions with alkyl chain containing less than six carbons can be intercalated. However, as the number of water molecule in the interlayer spaces of the smectite is increased in monomolecular or bimolecular arrangements, the carbon number of the guest substance which can be intercalated in the interlayer spaces of the smectite becomes large. When the weight ratio of the water in the interlayer spaces of the smectite is more than 20%, the solid-solid reaction can not be caused satisfactorily, because the water increases the moistness of the smectite causing it to be sticky. Therefore, the smectite is required to include the water in the interlayer spaces of the smectite with 0 to 20% by weight.

The mixing ratio of the guest organic substance to the smectite as the host crystal is 10 to 500milli equivalents of the guest substance per 100g of the smectite. If the ratio is smaller than 10milli equivalents, the numbers of organic ions or organic molecules which can be intercalated are too small for the number of exchangeable cations of the smectite. In this case, the solvation of the organic smectite is too small to obtain desired effects thereof. On the other hand, if the ratio is larger than 500milli equivalents, the amount of the guest organic substance exceeds the intercalatable amount to cause waste of the guest substance. A more preferable ratio is 100 to 200milli equivalents of the guest organic substance per 100g of the smectite. Since the occupied space by the guest organic substance depends on the size of the organic substance, suitable ratio should be selected from the range within the above mentioned ratio in accordance with the guest organic substance used in each process.

The solid-solid reaction between the host smectite and the guest organic substance is carried out by mixing the smectite and the organic substance at a temperature from 5 to 50° C. and under an applied pressure from 0.5 to 10kg/cm$^2$. If the temperature is below 5° C., the solid-solid reaction is not carried out satisfactorily. On the other hand, if the temperature is above 50° C., some organic substances begin to melt or the vapor pressures of other organic substances become high. Therefore, it is difficult to carry out the solid-solid reaction and to mix the smectite and the organic substance due to the increased moistness of the organic substance. A more preferable temperature range is 20° to 40° C. If the pressure is below 0.5kg/cm$^2$, the reaction is carried out inefficiently because it takes a long time to mix by stirring. If the pressure is above 10kg/cm$^2$, it is not economical because of the necessity of an expensive apparatus.

In the process for preparing the organic smectite related to the present invention, the solid-solid reaction is understood to be proceeded by the intercalation of the organic cations or the basic organic molecules as the guest organic substance in the interlayer spaces following the diffusion of the intercalated substance. The organic cations or basic organic molecules can be intercalated in the interlayer spaces without any change of the stacking of the smectite because of the solid-solid reaction. Therefore, the products of the process can be a crystal which has a solid structure.

The organic smectite including the hydrophobic guest organic substance in the interlayer spaces thereof is solvated to be semitransparent viscous sol in a polar solvent such as methanol, ethanol and the like or in a nonpolar solvent such as benzene, toluene, nitrobenzene, pyridine, furfural and the like. Accordingly, if the viscous sol is added to grease, lipophilic paint, printing ink, organic coking agent and the like, their viscosity is increased due to a nature of the organic smectite as a protective colloid. Further, the viscous sol depresses their freezing point, although petroleum lubricant does not so. Thus, even under high temperature, the stability of the viscous sol is larger than that of commonly used organic lubricants. As a result, the viscous sol made from the organic smectite has a wide temperature range of heat-resistance.

The invention will hereinafter be described in detail by the following examples, but it is to be understood that the invention is not limited thereto.

EXAMPLE 1

100g of Kunipia F (trade name for purified bentonite, mainly containing a clay mineral; montmollironite) manufactured by Kunimine Co. Ltd., Japan as host smectite was dried at 300° C. for 2 hours in order to prepare bentonite which does not include interlayer water in the interlayer spaces of the bentonite. 27g of hexylamine hydrochloride (ca. 200milli equivalents/100g bentonite) was added to the anhydrous bentonite and mixed with it. The mixture was stirred in a 500ml porcelain mortar with a stirring rod connected to a motor at 25° C. for 20 minutes in order to cause a solid-solid reaction. An applied pressure to the ground mixture was ca. 1.5kg/cm$^2$.

The results of X.ra diffractometry showed the interlayer spacing of the product as follows; the basal spacing d(001) was 13.5Å, indicating the expansion of the interlayer space by 3.8Å compared with the interlayer spacing of the anhydrous bentonite of 9.7Å (measured value). Accordingly, it was confirmed that the hexylamine was intercalated in the interlayer space of the host bentonite. Further, it was confirmed similarly by infrared spectroscopy, differential thermal analysis, thermogravimetric analysis, and elementary analysis.

When the product was put into toluene, it was solvated to be swollen and to be semitransparent and light yellow. On the other hand, the material (the bentonite) could not be swollen to be undissolved lumps in toluene. Then, the toluene including the bentonite was stirred. However, the undissolved lumps of the bentonite was not swollen and not dispersed but was deposited at the bottom of a beaker.

EXAMPLE 2

At first, 100g of purified bentonite manufactured by Hojun Mining Industry Co. Ltd. as host smectite was dried at 100° C. Then, it was left in a desiccator with sulfuric acid having a relative humidity of 70 % for 24 hours so that water was absorbed in the interlayer space of the bentonite. The basal spacing d(001) of this sample was 12.5Å, thus it was confirmed that the water was intercalated in a substantial monomolecular arrangement in the interlayer space of the sample. 26g of trimethylstearylammonium chloride (ca. 75milli equivalents /100g) was added to the sample as the host bentonite and mixed with it. Then the mixture was stirred with a stirrer like that of Example 1 at 30° C. under an applied pressure of ca. 2kg/cm$^2$ for 30 minutes By the result of X-ray diffractometry showed the interlayer spacing of the product of 19Å, together with the results of infrared spectroscopy, thermal analysis, and elementary analysis, the intercalation of quaternary ammonium ion was confirmed.

When the product was put into benzene, it was solvated to be swollen and to be semitransparent and light yellow with stickiness. On the other hand, in case of only the purified bentonite, it was not swollen but became undissolved lumps and was deposited instantly in toluene.

EXAMPLE 3

At first, 100g of synthetic saponite manufactured by Kunimine Co. Ltd. as host smectite was dried at 100° C. Then, it was left in a desiccator with sulfuric acid having a relative humidity of 80% for two days and nights so that water in a monomolecular arrangement was absorbed in the interlayer space of the host smectite. 58g of dimethyldistearylammonium chloride (ca. 100milli equivalents/100g saponite) was added to the treated saponite and mixed with it. The mixture was stirred in a porcelain mortar at 30° C. for 15 minutes under an applied pressure of 3kg/cm$^2$.

The intercalation of quaternary ammonium ion was confirmed by the result of X-ray diffractometry, infrared spectroscopy, thermal analysis, and elementary analysis.

When the product was put into nitrobenzene, it was solvated to be swollen and to be semitransparent and white in the form of grease. On the other hand, in case of only the synthetic saponite, solvation with swell did not occur.

EXAMPLE 4

At first, 100g of hectorite from API samples as host smectite was left in a desiccator with sulfuric acid having a relative humidity of 80% for a day and night so that water was absorbed in the interlayer space of the host smectite. Then, 42g of benzyldimethylstearylammonium chloride (ca. 100milli equivalents/100g hectorite) was added to the treated hectorite and mixed with it. The mixture was stirred in a porcelain mortar at 40° C. for 20 minutes under an applied pressure of 1.5kg/cm$^2$.

Intercalation in the product was confirmed by the result of X-ray diffractometry, infrared spectroscopy, thermal analysis, and elementary analysis. When the product was immersed in toluene, it was solvated to be swollen and to be semitransparent and white in the form of grease. On the other hand, in case of only the hectorite, solvation with swell did not occur.

EXAMPLE 5

Bentonite which is known as Volclay (trade name) manufactured by IMC Co. Ltd. in USA was impregnated with water and dried in air to be host bentonite (mainly containing a clay mineral; montmollironite). The basal spacing d(001) of this sample showed 15.4Å, thus the absorption of interlayer water in a substantial bimolecular arrangement was confirmed. 30g of trimethyloctadecylammonium chloride was added to 100g of the sample and mixed with it. The mixture was stirred in a porcelain mortar at 30° C. for 2 hours under an applied pressure of 1.5kg/cm$^2$.

The results of X-ray diffractometry, infrared spectroscopy, thermal analysis and elementary analysis showed the basal spacing d(001) of 22.0Å. Thereby, the intercalation of the quaternary ammonium ion was confirmed. When the product was put into toluene, it was solvated to be swollen and to be light yellow with sticky. On the other hand, in case of only the Volclay bentonite, it could not be swollen and deposited in the form of undissolved lumps.

EXAMPLE 6

Bentonite which is known as Bigborn (trade name) from U.S.A. was left in a desiccator with sulfuric acid having a relative humidity of 90% in order to absorb water sufficiently. Then, 14g of dimethylpyridinium chloride was added to 100 g of this sample and mixed with it. The mixture was stirred in a porcelain mortar at 30° C. for 30 minutes under an applied pressure of 1.5kg/cm$^2$.

As to the product, the intercalation of pyridinium ion was confirmed by the result of X-ray diffractometry, infrared spectroscopy, thermal analysis, and elementary analysis. When the product was immersed in pyridine, it was solvated to be swollen in the form of grease. On the other hand, in case of only the powder of Bigborn, solvation with swell did not occur.

EXAMPLE 7

At first, 100g of bidellite from API samples as host smectite was impregnated with water and was dried in air to absorb interlayer water sufficiently. Then, 35g of dodecylpyridinium chloride (ca. 100 milli equivalents/100g bidellite) was added to the treated bidellite and mixed with it. The mixture was stirred in a porcelain mortar at 30° C. for 60 minutes under an applied pressure of 1 to 1.2kg/cm$^2$.

As to the product, the intercalation of the dodecylpyridinium ion was confirmed by the result of X-ray diffractometry, infrared spectroscopy, thermal analysis, and elementary analysis. When the product was put into furfural, it was solvated to be swollen and to be semitransparent and light yellow with sticky. On the other hand, in case of only the bidellite, it was not solvated and not swollen but deposited in furfural.

EXAMPLE 8

Kunipia F (trade name for purified bentonite, mainly containing a clay mineral; montmollironite) manufactured by Kunimine Co. Ltd., as host smectite was dried at 300° C. for 2 hours in order to prepare bentonite which does not include water in the interlayer spaces of the host smectite. 35g of acrylamide (ca. 500milli equivalents/100g bentonite) and 1% of benzylperoxide as an initiator of polymerization were added to 10g of the anhydrous bentonite and mixed with it. The mixture was stirred in a 500ml porcelain mortar with a stirring rod connected to a motor at 30° C. for 20 minutes in order to cause a solid-solid reaction. An applied pressure to the ground mixture was ca. ? .5kg/cm$^2$.

The produced composite was left in an oven at 65° C. for one hour and the acrylamide was polymerized to be stable poly(acrylamide), thus the acrylamide never come off the inter. layer spaces.

The result of X-ray diffractometry showed a basal spacing d(001) was 19.1Å, thus it was confirmed that the acrylamide was intercalated in a bimolecular arrangement. Further, it was confirmed similarly by infrared spectroscopy, thermogravimetric analysis, and elementary analysis.

EXAMPLE 9

All experiment conditions are same to those of Example 8 except the condition of a guest substance. In this Example, in stead of 35g of acrylamide, 45g of methacrylamide was used as the guest substance.

The produced composite was left in an oven at 70° C. for one hour and the metacrylamide was polymerized in order not to come off the interlayer spaces of the composite.

The result of X-ray diffractometry showed a basal spacing d(001) was 20Å, thus it was confirmed that the metacrylamide was intercalated in a bimolecular arrangement. Further, it was confirmed similarly by infrared spectroscopy, thermogravimetric analysis, and elementary analysis.

What is claimed is:

1. A process for preparing organic smectite applied for thickener, protective colloid, dispersant and binder, which comprises:

mixing smectite including 0 to 20% by weight of interlayer water in the interlayer spaces of said smectite with a solid organic cation-supplying substance selected from at least one of aliphatic alkylamine salts, aromatic amine salts and basic organic compounds having pyridine nucleus, and/or basic organic molecules in an mixing ratio of the latter to the former of 10 to 500 milliequivalents per 100g smectite, and stirring the resultant mixture at a temperature of 5 to 50° C. under an applied pressure of 0.5 to 10 kg/cm$^2$ to cause a solid-solid reaction.

2. A process for preparing organic smectite claimed in claim 1, wherein said basic organic molecules are selected from at least one of acrylamide, methacrylamide, urea, phenanthroline, bipyridyl, diazo compounds, azo compounds and transition metal trisbipyridyl complexes.

* * * * *